(12) United States Patent
Goya et al.

(10) Patent No.: US 10,162,187 B2
(45) Date of Patent: Dec. 25, 2018

(54) HIGH-OUTPUT OPTICAL ATTENUATOR, MEASUREMENT DEVICE, AND 3D SHAPING APPARATUS

(71) Applicant: TECHNOLOGY RESEARCH ASSOCIATION FOR FUTURE ADDITIVE MANUFACTURING, Tokyo (JP)

(72) Inventors: Saneyuki Goya, Yokohama (JP); Toshiya Watanabe, Yokohama (JP); Minoru Danno, Yokohama (JP); Yoshihito Fujita, Ritto (JP); Haruhiko Niitani, Ritto (JP)

(73) Assignee: TECHNOLOGY RESEARCH ASSOCIATION FOR FUTURE ADDITIVE MANUFACTURING

( * ) Notice: Subject to any disclaimer, the term of this patent is extended or adjusted under 35 U.S.C. 154(b) by 97 days.

(21) Appl. No.: 14/763,151

(22) PCT Filed: Mar. 10, 2015

(86) PCT No.: PCT/JP2015/056930
§ 371 (c)(1),
(2) Date: Jul. 23, 2015

(87) PCT Pub. No.: WO2016/143056
PCT Pub. Date: Sep. 15, 2016

(65) Prior Publication Data
US 2017/0038596 A1    Feb. 9, 2017

(51) Int. Cl.
*G02B 27/14*    (2006.01)
*B23K 26/36*    (2014.01)
(Continued)

(52) U.S. Cl.
CPC ............ *G02B 27/144* (2013.01); *B23K 26/36* (2013.01); *G02B 27/108* (2013.01); *G01J 1/0418* (2013.01); *G02B 5/205* (2013.01)

(58) Field of Classification Search
CPC .... G02B 27/144; G02B 27/108; G02B 5/205; G01J 1/0418; B23K 26/36
See application file for complete search history.

(56) References Cited

U.S. PATENT DOCUMENTS 4,678,298 A * 7/1987 Perisic ................... G03B 35/02
                                                        352/57
7,812,944 B1 * 10/2010 Schmidt ............. G01N 21/6452
                                                        356/317
(Continued)

FOREIGN PATENT DOCUMENTS

JP    2-140501 U    11/1990
JP    2007-49195 A    2/2007
(Continued)

OTHER PUBLICATIONS

European Search Report (ESR) dated Mar. 28, 2017 in connection with corresponding EP Application 15762904.9.
(Continued)

*Primary Examiner* — Georgia Y Epps
*Assistant Examiner* — Don Williams
(74) *Attorney, Agent, or Firm* — Ladas & Parry LLP

(57) ABSTRACT

This invention is directed to attenuating a beam output without changing the beam position and the beam diameter. A high-output optical attenuator includes a first reflector that totally reflects incident light and causes first reflected light serving as reflected light of the incident light to enter a second reflecting portion, a second reflector that reflects the first reflected light and causes second reflected light serving as reflected light of the first reflected light to enter a third reflecting portion, a third reflector that reflects the second reflected light and causes third reflected light serving as
(Continued)

reflected light of the second reflected light to enter a fourth reflecting portion, and a fourth reflector that reflects the third reflected light as fourth reflected light having the same optical axis as the optical axis of the incident light. At least two of the second reflector, the third reflector, and the fourth reflector are half mirrors.

8 Claims, 7 Drawing Sheets

(51) Int. Cl.
    *G02B 27/10*     (2006.01)
    *G01J 1/04*     (2006.01)
    *G02B 5/20*     (2006.01)

(56) References Cited

U.S. PATENT DOCUMENTS

2004/0141184 A1*   7/2004   Ueki ................. G01B 9/02004
                                                356/497

2004/0224508 A1   11/2004   Engel et al.
2009/0310111 A1   12/2009   Arif

FOREIGN PATENT DOCUMENTS

| JP | 2009-99987 A | 5/2009 |
| JP | 2011-215287 A | 10/2011 |
| JP | 2011-110560 A | 11/2011 |

OTHER PUBLICATIONS

J-PlatPat English abstract of JP 2011-215287 A.
Patent Abstracts of Japan English abstract of JP 2011-110560 A.
Eriksson, I., "The monitoring of a laser beam", Thesis Mid Sweden University, Dec. 31, 2006, 43 pages.
International Search Report dated Jun. 17, 2015 for Application No. PCT/JP2015/056930.
J-PlatPat English abstract of JP 2007-49195 A.
J-PlatPat English abstract of JP 2009-99987 A.

* cited by examiner

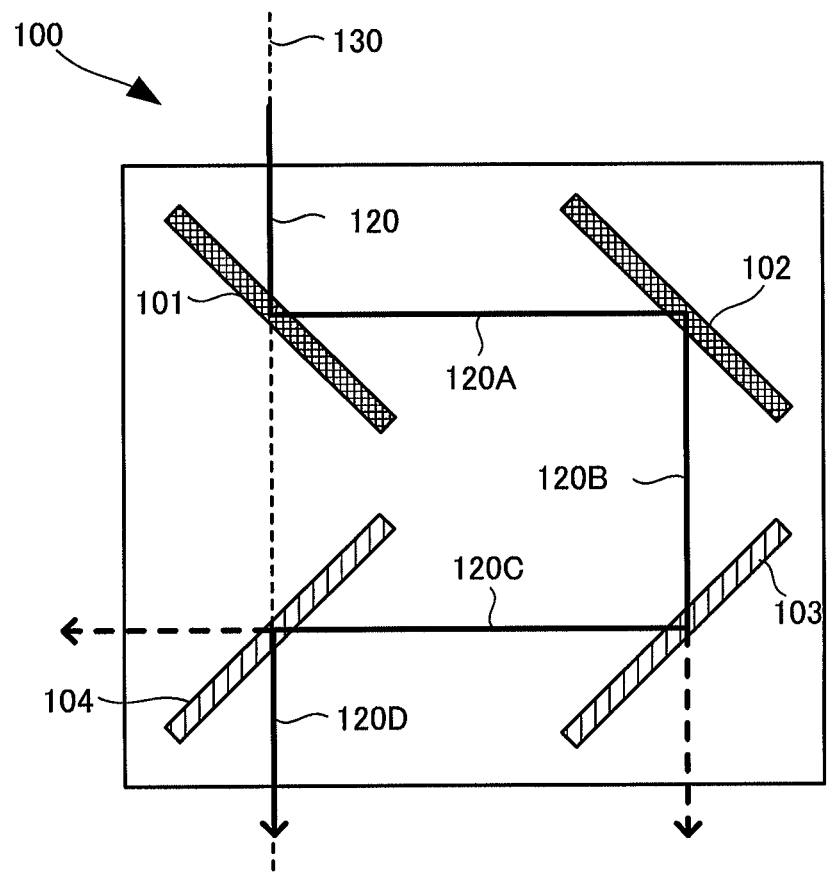
F I G. 1

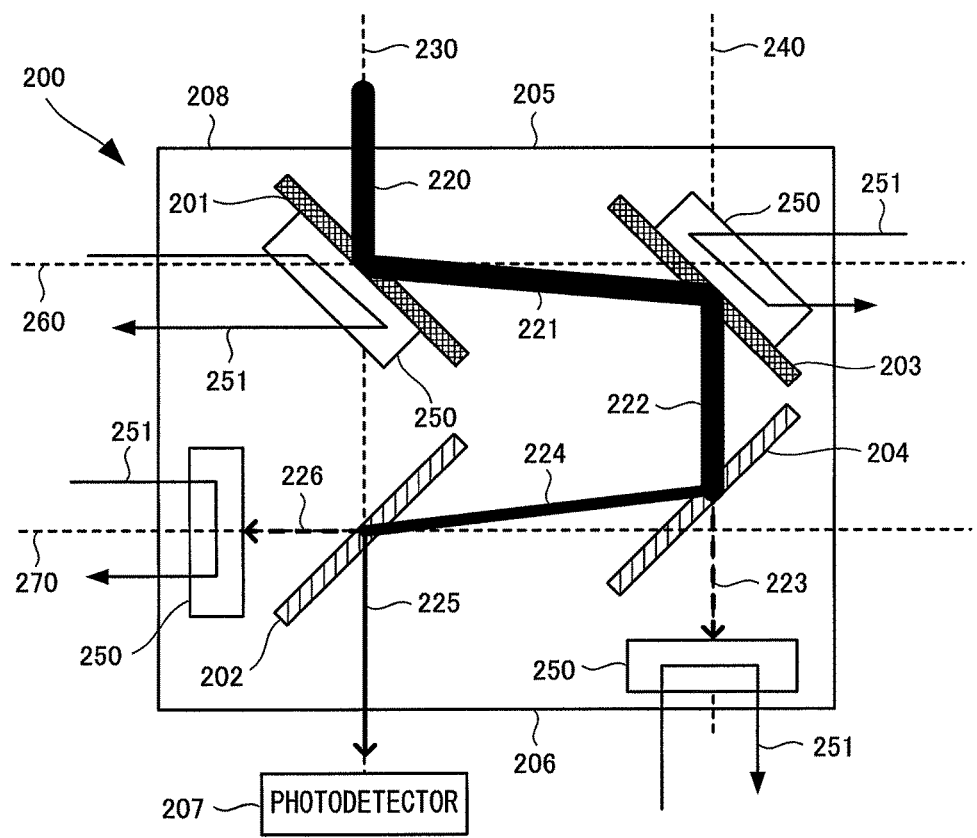
F I G. 2B

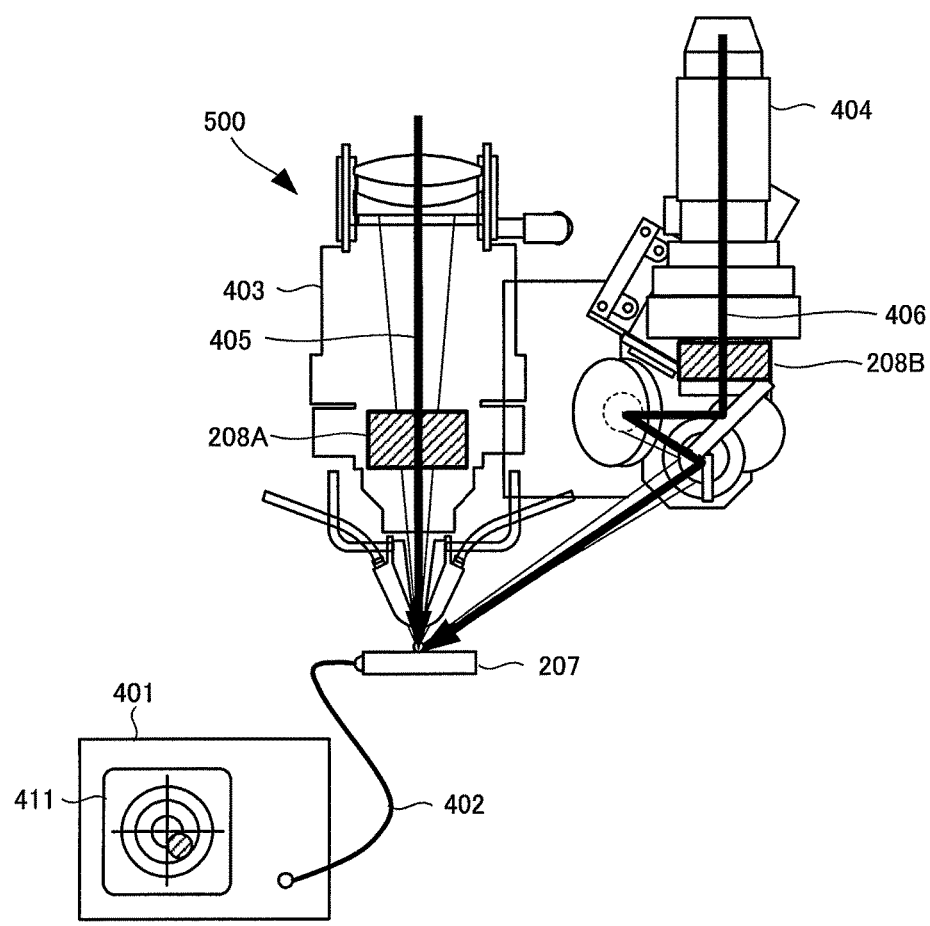
F I G. 5

HIGH-OUTPUT OPTICAL ATTENUATOR, MEASUREMENT DEVICE, AND 3D SHAPING APPARATUS

RELATED APPLICATION

This application is an application under 35 U.S.C. 371 of International Application No. PCT/JP2015/056930 filed on Mar. 10, 2015, the entire contents of which are incorporated herein by reference.

TECHNICAL FIELD

The present invention relates to a high-output optical attenuator, a measurement device, and a 3D shaping apparatus.

BACKGROUND ART

In the above technical field, patent literature 1 discloses a technique of attenuating a laser beam by using a filter.

CITATION LIST

Patent Literature

Patent literature 1: Japanese Patent No. 4551385

SUMMARY OF THE INVENTION

Technical Problem

In the technique described in this literature, a beam output cannot be attenuated without changing the beam position and the beam diameter.

The present invention enables to provide a technique of solving the above-described problem.

Solution to Problem

One aspect of the present invention provides a high-output optical attenuator comprising:
a first reflector that totally reflects incident light and causes first reflected light serving as reflected light of the incident light to enter a second reflecting portion;
a second reflector that reflects the first reflected light and causes second reflected light serving as reflected light of the first reflected light to enter a third reflecting portion;
a third reflector that reflects the second reflected light and causes third reflected light serving as reflected light of the second reflected light to enter a fourth reflecting portion; and
a fourth reflector that reflects the third reflected light as fourth reflected light having the same optical axis as an optical axis of the incident light,
wherein at least two of the second reflector, the third reflector, and the fourth reflector are half mirrors.

Another aspect of the present invention provides a measurement device comprising the high-output optical attenuator and a photodetector.

Still other aspect of the present invention provides a 3D shaping apparatus using the measurement device.

Still other aspect of the present invention provides a measurement device comprising the high-output optical attenuator and a photodetector.

Still other aspect of the present invention provides a 3D shaping apparatus using the measurement device.

Advantageous Effects of Invention

According to the present invention, a beam output can be attenuated without changing the beam position and the beam diameter.

BRIEF DESCRIPTION OF DRAWINGS

FIG. 1 is a view showing the arrangement of a high-output optical attenuator according to the first embodiment of the present invention;
FIG. 2B is a view showing the arrangement of the measurement device according to the second embodiment of the present invention;
FIG. 5 is a view showing the arrangement of a 3D shaping apparatus according to the fifth embodiment of the present invention.

DESCRIPTION OF THE EMBODIMENTS

Figure 2A:
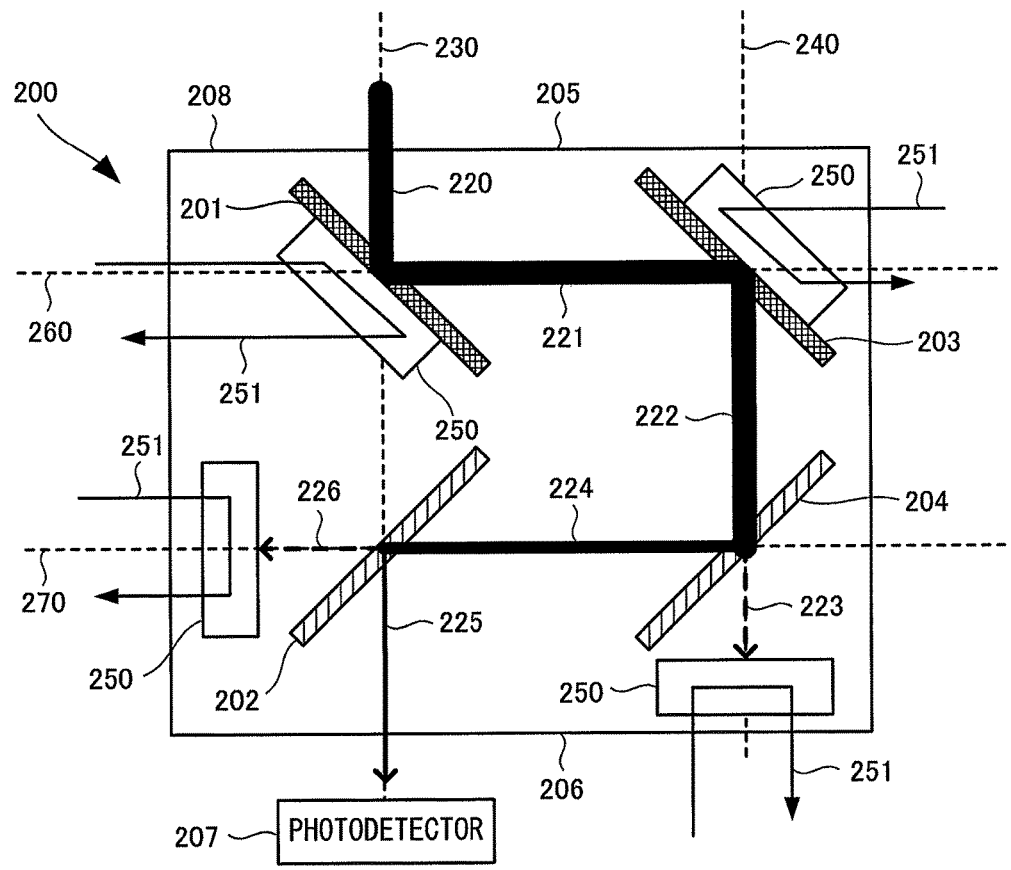
FIG. 2A is a view showing the arrangement of a measurement device according to the second embodiment of the present invention.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A high-output optical attenuator 100 according to the first embodiment of the present invention will be described with reference to FIG. 1. The high-output optical attenuator 100 is a device that attenuates the output of incident high-output light.

As shown in FIG. 1, the high-output optical attenuator 100 includes reflectors 101, 102, 103, and 104.

The reflector 101 totally reflects incident light 120, and causes reflected light 120A serving as reflected light of the incident light 120 to enter the reflector 102. The reflector 102 reflects the reflected light 120A, and causes reflected light 120B serving as reflected light of the reflected light 120A to enter the reflector 103.

The reflector 103 reflects the reflected light 120B, and causes reflected light 120C serving as reflected light of the reflected light 120B to enter the reflector 104. The reflector 104 reflects the reflected light 120C as reflected light 120D having an optical axis 130 which is the same as that of the incident light 120. At least two of the reflectors 102, 103, and 104 are half mirrors.

According to the first embodiment, a beam output can be attenuated without changing the beam position and the beam diameter.

Second Embodiment

A measurement device using a high-output optical attenuator according to the second embodiment of the present invention will be described with reference to FIGS. 2A and 2B.

(Prerequisite Technique)

First, a prerequisite technique of this embodiment will be explained. In a laser processing apparatus, the irradiation position (beam position) of a laser beam is confirmed based on a guide beam. When, for example, the output of a laser beam is large, neither the beam position nor beam diameter can be confirmed accurately from the guide beam.

To confirm the beam position (focus position) or beam diameter of a laser beam in the laser processing apparatus, a test piece must be set on a work and irradiated with a laser beam at a low output. After that, the test piece must be dismounted from the work in the laser processing apparatus, and a processing trace by the laser beam must be checked through a microscope or the like.

To set the focus position and beam diameter of a laser beam to be predetermined values in this laser processing apparatus, the operation of irradiating a test piece with a laser beam and checking a processing trace generated by the laser beam needs to be performed repetitively.

In addition, this operation needs to be executed for both a lamination optical system and a heating optical system. When a laser beam from the heating optical system obliquely enters a processing material, adjustment of the focus position and beam diameter of the laser beam becomes more difficult.

A processing laser beam used in a 3D shaping apparatus normally has an output of several hundred W to several kW. To the contrary, a light receiving element such as a CCD (Charge Coupled Device) sensor receives weak light having an output in μW to mW. Therefore, the element such as the CCD sensor cannot detect such a large-output processing laser beam.

(Technique According to Embodiment)

FIGS. 2A and 2B are views for explaining the arrangement of a measurement device 200 using a high-output optical attenuator according to this embodiment. As shown in FIG. 2A, the measurement device 200 includes a photodetector 207 and a high-output optical attenuator 208. The high-output optical attenuator 208 includes total reflection mirrors 201 and 203, half mirrors 202 and 204, and coolers 250.

The total reflection mirror 201 is arranged on an optical axis 230 of an incident beam 220, and further arranged on a plane 260 perpendicular to the optical axis 230. The total reflection mirror 201 reflects the laser beam 220. The laser beam 220 reflected by the total reflection mirror 201 changes its path by 90°, and travels as a laser beam 221 toward the total reflection mirror 203.

The total reflection mirror 203 is arranged on an axis 240 parallel to the optical axis 230, and further arranged on the same perpendicular plane 260 as the perpendicular plane on which the total reflection mirror 201 is arranged. The total reflection mirror 203 reflects the laser beam 221. The laser beam 221 reflected by the total reflection mirror 203 changes its path by 90°, and travels as a laser beam 222 toward the half mirror 204.

The half mirror 204 is arranged on the same axis 240 as the axis on which the total reflection mirror 203 is arranged, and further arranged on a perpendicular plane 270 parallel to the perpendicular plane 260. The laser beam 222 is split into a laser beam 224 that is reflected by the half mirror 204, and a laser beam 223 that passes through the half mirror 204.

The laser beam 222 reflected by the half mirror 204 changes its path by 90, and travels as the laser beam 224 toward the half mirror 202. The laser beam 222 having passed through the half mirror 204 reaches the cooler 250 as the laser beam 223 without changing its path.

The energies of the laser beam 224 reflected by the half mirror 204 and the laser beam 223 having passed through the half mirror 204 are attenuated in comparison with the laser beam 222 before splitting.

The half mirror 202 is arranged on the same optical axis 230 as the optical axis on which the total reflection mirror 201 is arranged, and further arranged on the same perpendicular plane 270 as the perpendicular plane on which the half mirror 204 is arranged. The laser beam 224 is split into a laser beam 225 that is reflected by the half mirror 202, and a laser beam 226 that passes through the half mirror 202.

The laser beam 224 reflected by the half mirror 202 changes its path by 90°, and travels as the laser beam 225 toward the photodetector 207. The laser beam 224 having passed through the half mirror 202 reaches the cooler 250 as the laser beam 226 without changing its path.

The energies of the laser beam 225 reflected by the half mirror 202 and the laser beam 226 having passed through the half mirror 202 are attenuated in comparison with the laser beam 224 before splitting.

In this manner, the energy of a laser beam is attenuated at the time of reflection (transmission) by the two half mirrors 202 and 204. As a result, the laser beam 220 entering the high-output optical attenuator 208 comes out of the high-output optical attenuator 208 as the laser beam 225 whose energy is attenuated from that of the laser beam 220.

Note that a half mirror in which the transmittance and reflectance of light are equal has been exemplified in the above description, but the present invention is not limited to this. A half mirror in which the transmittance and reflectance of light are different may be used. Also, an example in which two mirrors on the upstream side of incident light are total reflection mirrors, and two mirrors on the downstream side are as half mirrors has been explained above, but the present invention is not limited to this. It is also possible that only a mirror arranged at the position of the total reflection mirror 201 is a total reflection mirror, and mirrors arranged at the remaining positions are half mirrors.

The photodetector 207 detects the laser beam 225 coming out of the high-output optical attenuator 208. The photodetector 207 is, for example, a CCD sensor or a CMOS (Complementary Metal Oxide Semiconductor) sensor, but is not limited to them as long as this element can detect light.

The user can see the display screen of the photodetector 207 such as a CCD sensor and confirm the beam position of the laser beam 220. Further, the user can know a beam diameter from the beam pattern of the laser beam 220.

As described above, the total reflection mirror 201 is arranged on the optical axis 230 of the laser beam 220, and temporarily diverts the laser beam 220 to a side path. Then, the energy is attenuated using the half mirrors 202 and 204. Hence, the irradiation beam position of the laser beam 220 does not change (shift). The beam position and beam diameter of the laser beam 220 can be detected simultaneously.

The outputs of the laser beams 223 to 226 that have been reflected by or passed through the half mirrors 202 and 204 drop by 0.1% to 1%. However, to detect the laser beam 220 having an output of 100 W to several kW by the photodetector 207, the output needs to be decreased to about six orders of magnitude, and at least two half mirrors are necessary. However, the present invention is not limited to this. The number of half mirrors can be properly increased/decreased, as needed.

The coolers 250 cool the total reflection mirrors 201 and 203. Also, the coolers 250 cool the laser beams 223 and 226 respectively having passed through the half mirrors 202 and 204. A coolant 251 circulates through each cooler 250. The coolant 251 is, for example, water or alcohol, but is not limited to them as long as the coolant is a substance capable of cooling a laser beam.

As shown in FIG. 2B, the arrangement position of the total reflection mirror 203 may be moved down on the axis 240, and the arrangement position of the half mirror 204 may be moved up on the axis 240. Accordingly, the positions of the total reflection mirrors 203 and 201 on the perpendicular plane 260 differ from each other, and the positions of the half mirrors 204 and 202 on the perpendicular plane 270 differ from each other.

In this case, the angle of the total reflection mirror 201 is adjusted so that the reflected beam 221 reaches the total reflection mirror 203. In addition, the angle of the half mirror 204 is adjusted so that the reflected beam 224 reaches the half mirror 202.

The arrangement positions of the total reflection mirrors 201 and 203 and half mirrors 202 and 204 are not limited to the arrangements shown in FIGS. 2A and 2B, and various arrangements are possible.

According to the second embodiment, a beam output can be attenuated without changing the beam position and beam diameter of the laser beam. Since a laser beam entering the high-output optical attenuator is temporarily diverted sideways, the output of the laser beam can be attenuated without increasing the thickness of the high-output optical attenuator, and the high-output optical attenuator 208 can be installed in a narrow place.

According to the second embodiment, the energy of the laser beam 220 can be removed without changing the output of the laser beam 220. Further, since the output of the laser beam 220 can be attenuated without diffusing the laser beam 220, the beam diameter of the laser beam 220 does not change and an accurate beam diameter can be measured.

Third Embodiment

Figure 3:
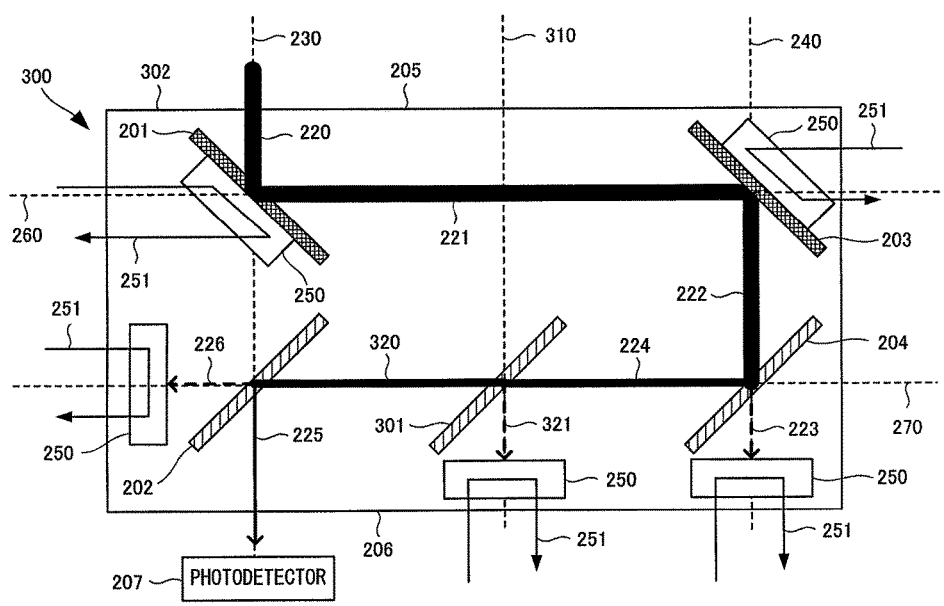
FIG. 3 is a view showing the arrangement of a measurement device according to the third embodiment of the present invention.

A measurement device using a high-output optical attenuator according to the third embodiment of the present invention will be described with reference to FIG. 3. FIG. 3 is a view for explaining the arrangement of a measurement device 300 using a high-output optical attenuator according to this embodiment. The measurement device 300 according to the third embodiment is different from the measurement device according to the second embodiment in that one extra half mirror is arranged. The remaining arrangement and operation are the same as those in the second embodiment, so the same reference numerals denote the same arrangement and operation and a detailed description thereof will not be repeated.

The measurement device 300 includes a high-output optical attenuator 302 and a photodetector 207. The high-output optical attenuator 302 includes a half mirror 301 arranged between half mirrors 202 and 204. The half mirror 301 is arranged on an axis 310.

The half mirrors 202, 204, and 301 are arranged on a perpendicular plane 270. Note that the arrangement of the half mirrors 202, 204, and 301 are not limited to this. For example, the arrangement position of the half mirror 301 may a position shifted from the perpendicular plane 270, and various arrangements are possible.

A laser beam 220 is reflected by a total reflection mirror 220 and travels toward a total reflection mirror 203. A laser beam 221 is reflected by the total reflection mirror 203 and travels toward the half mirror 204. Part of a laser beam 222 is reflected by the half mirror 204 and travels toward the half mirror 301, and the remaining part passes the half mirror 204 and travels toward a cooler 250.

Part of a laser beam 224 is reflected by the half mirror 301 and travels as a laser beam 321 toward the cooler 250, and the remaining part passes the half mirror 301 and travels as a laser beam 320 toward the half mirror 202. Although the number of half mirrors is three in the embodiment, the number of half mirrors is not limited to this, and three or more half mirrors may be arranged.

According to the third embodiment, the number of half mirrors is increased, so the output of a laser beam can be attenuated much more.

Fourth Embodiment

Figure 4:
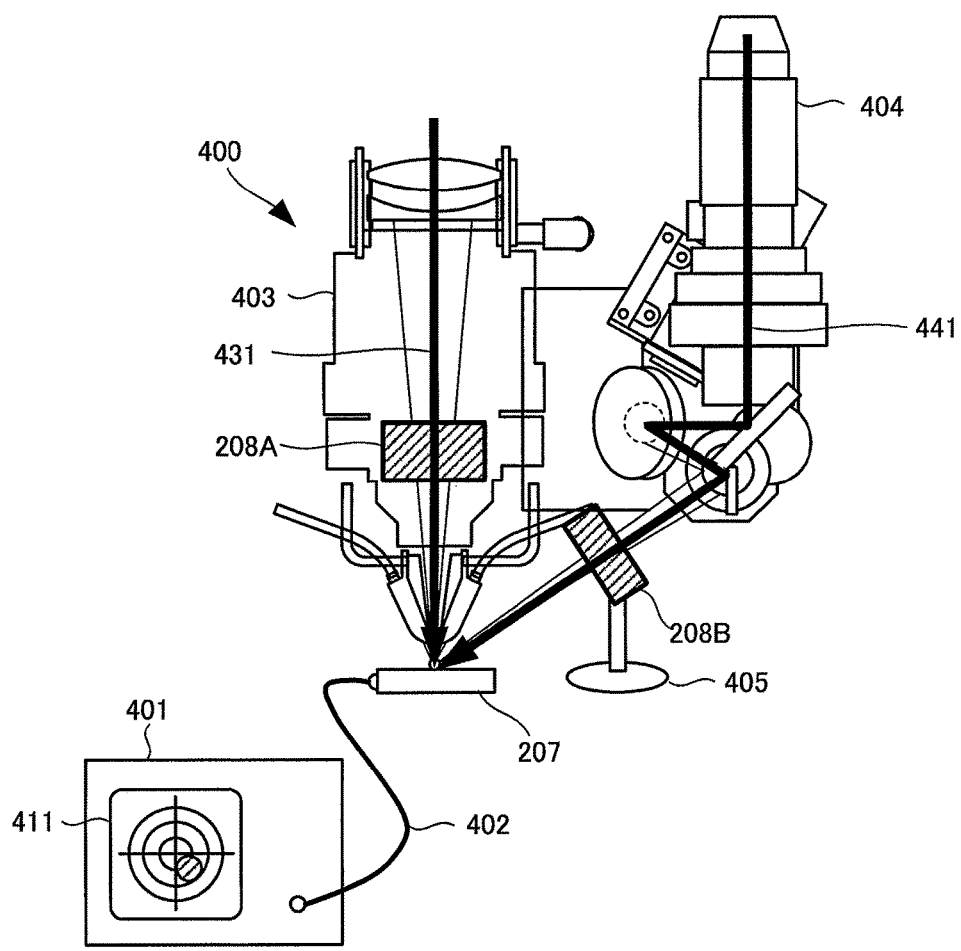
FIG. 4 is a view showing the arrangement of a 3D shaping apparatus according to the fourth embodiment of the present invention.

A 3D shaping apparatus according to the fourth embodiment of the present invention will be described with reference to FIG. 4. FIG. 4 is a view for explaining the arrangement of a 3D shaping apparatus 400 according to this embodiment. The 3D shaping apparatus according to the fourth embodiment is a 3D shaping apparatus using the high-output optical attenuator described in the second embodiment. The remaining arrangement and operation are the same as those in the second embodiment, so the same reference numerals denote the same arrangement and operation and a detailed description thereof will not be repeated.

The 3D shaping apparatus 400 includes a monitor 401, a cable 402, a lamination optical system housing 403, a heating optical system housing 404, and a support jig 405.

A photodetector 207 is connected to the monitor 401 via the cable 402. The user can confirm the beam position and beam diameter of a laser beam on a display screen 411 of the monitor 401.

A high-output optical attenuator 208A is detachably installed in a space for attaching the high-output optical attenuator 208A within the lamination optical system housing 403. The high-output optical attenuator 208A is arranged on the optical path of a lamination laser beam 431. The output of the lamination laser beam 431 is attenuated by the high-output optical attenuator 208A, and the lamination laser beam 431 reaches the photodetector 207.

A high-output optical attenuator 208B is arranged outside the heating optical system housing 404. Also, the high-output optical attenuator 208B is arranged on the optical path of a heating laser beam 441, and supported by the support jig 405. The output of the heating laser beam 441 is attenuated by the high-output optical attenuator 208B, and the heating laser beam 441 reaches the photodetector 207.

The high-output optical attenuators 208A and 208B are used only when the beam positions and beam diameters of the lamination laser beam 431 and heating laser beam 441 need to be measured. When processing a 3D shaped object, the high-output optical attenuators 208A and 208B are detached and not used.

According to the fourth embodiment, the high-output optical attenuator 208A is detachable from the 3D shaping apparatus 400, and the high-output optical attenuator 208B can be arranged on the path of a heating laser beam. Thus, the beam positions and beam diameters of the lamination laser beam 431 and heating laser beam 441 can be measured, for example, before or after processing other than during processing.

Fifth Embodiment

A 3D shaping apparatus according to the fifth embodiment of the present invention will be described with reference to FIG. 5. FIG. 5 is a view for explaining the arrangement of a 3D shaping apparatus 500 according to this embodiment. The 3D shaping apparatus 500 according to the fifth embodiment is different from the 3D shaping apparatus according to the fourth embodiment in that a high-output optical attenuator 208B is arranged inside a heating optical system housing 404. The remaining arrangement and operation are the same as those in the fourth embodiment, so the same reference numerals denote the same arrangement and operation and a detailed description thereof will not be repeated.

The high-output optical attenuator 208B is detachably installed in an installation space ensured inside the heating optical system housing 404.

According to the fifth embodiment, a high-output optical attenuator 208A and the high-output optical attenuator 208B are detachable from the 3D shaping apparatus 500. The beam positions and beam diameters of a lamination laser beam 431 and heating laser beam 441 can be measured, for example, before or after processing other than during processing.

Sixth Embodiment

Figure 6:
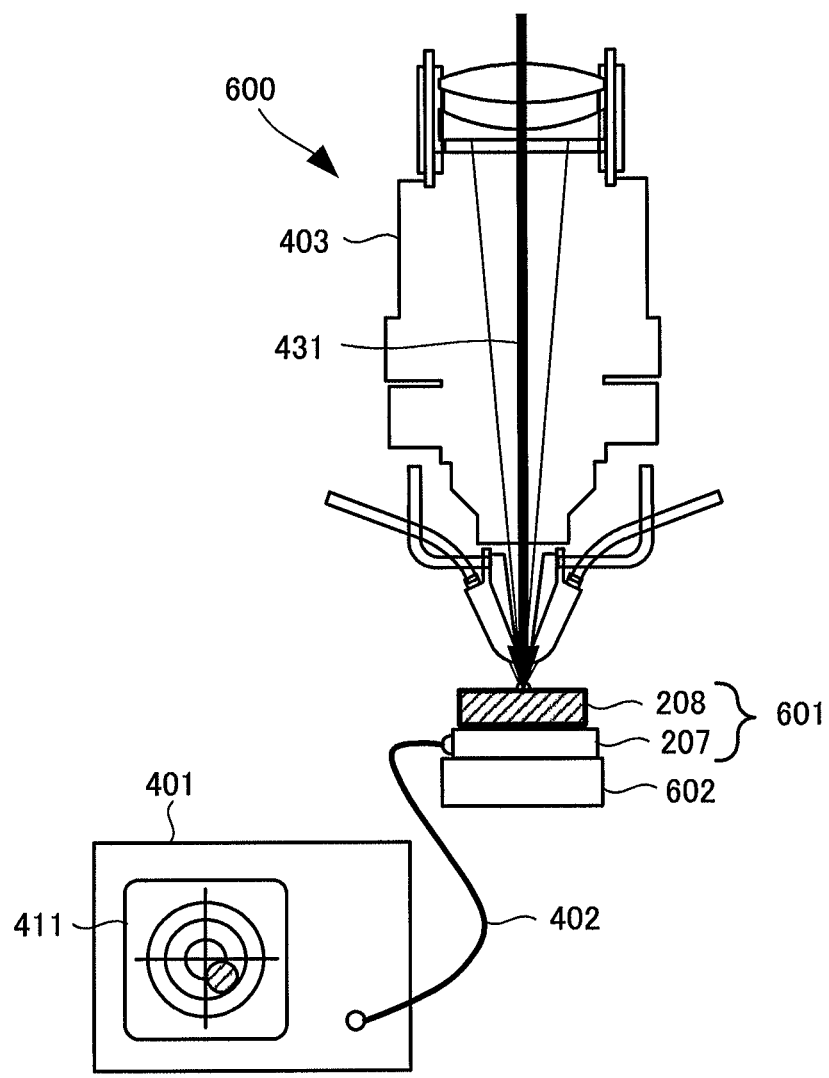
FIG. 6 is a view showing the arrangement of a 3D shaping apparatus according to the sixth embodiment of the present invention.

A 3D shaping apparatus according to the sixth embodiment of the present invention will be described with reference to FIG. 6. FIG. 6 is a view for explaining the arrangement of a 3D shaping apparatus according to this embodiment. The 3D shaping apparatus according to the sixth embodiment is different from the 3D shaping apparatus according to the fourth embodiment in that an integrated measurement device is used. The remaining arrangement and operation are the same as those in the second embodiment, so the same reference numerals denote the same arrangement and operation and a detailed description thereof will not be repeated.

A 3D shaping apparatus 600 uses a measurement device 601 constituted by integrating a high-output optical attenuator 208 and a photodetector 207. Although only a lamination optical system is illustrated in FIG. 6, the same arrangement also applies to a heating optical system.

The 3D shaping apparatus 600 has an arrangement in which the measurement device 601 is only placed on a work 602 of the 3D shaping apparatus 600. With the arrangement in which the measurement device 601 is only placed on the work 602, the beam position and beam diameter of a laser beam 431 can be measured easily.

According to the sixth embodiment, since the measurement device constituted by integrating the high-output optical attenuator and the photodetector is only placed on a work, the beam position and beam diameter of a laser beam can be measured easily. Since the space for attaching the measurement device need not be ensured in the 3D shaping apparatus, the beam position and beam diameter of a laser beam can be easily measured even in an existing 3D shaping apparatus having no installation space.

Other Embodiments

The present invention has been described above with reference to the embodiments. However, the present invention is not limited to those embodiments. Various changes understandable by those skilled in the art within the scope of the present invention can be made for the arrangements and details of the present invention. The present invention also incorporates a system or apparatus that somehow combines different features included in the respective embodiments.

The invention claimed is:

1. A high-output optical attenuator comprising:
   a first reflector that totally reflects incident light and causes first reflected light serving as reflected light of the incident light to enter a second reflecting portion;
   a second reflector that reflects the first reflected light and causes second reflected light serving as reflected light of the first reflected light to enter a third reflecting portion;
   a third reflector that reflects the second reflected light and causes third reflected light serving as reflected light of the second reflected light to enter a fourth reflecting portion;
   a fourth reflector that reflects the third reflected light as fourth reflected light having the same optical axis as an optical axis of the incident light;
   a first cooler that cools a light passed through said third reflector; and
   a second cooler that cools a light passed through said fourth reflector,
   wherein said first reflector and said second reflector are total reflection mirrors, and said third reflector and said fourth reflector are half mirrors.

2. The high-output optical attenuator according to claim 1, wherein
   said first reflector and said fourth reflector are arranged on the optical axis of the incident light, and
   said second reflector and said third reflector are arranged on an axis parallel to the optical axis.

3. The high-output optical attenuator according to claim 1, wherein
   said first reflector and said second reflector are arranged on a first perpendicular plane perpendicular to the optical axis, and
   said third reflector and said fourth reflector are arranged on a second perpendicular plane parallel to the first perpendicular plane.

4. The high-output optical attenuator according to claim 1, further comprising at least one reflector arranged between said third reflector and said fourth reflector,
   wherein said reflector is a half mirror.

5. A measurement device comprising a high-output optical attenuator as in claim 1, and a photodetector.

6. The measurement device according to claim 5, wherein said high-output optical attenuator and said photodetector are integrated.

7. The measurement device according to claim 5, wherein said photodetector is one of a CCD sensor and a CMOS sensor.

8. A 3D shaping apparatus using a measurement device as in claim 5.

* * * * *